US012598606B2

(12) United States Patent
Zou et al.

(10) Patent No.: US 12,598,606 B2
(45) Date of Patent: Apr. 7, 2026

(54) PRIORITIZATION FOR SCHEDULING REQUEST AND PHYSICAL UPLINK SHARED CHANNEL WITHOUT LOGICAL CHANNEL ASSOCIATION

(71) Applicant: Telefonaktiebolaget LM Ericsson (publ), Stockholm (SE)

(72) Inventors: Zhenhua Zou, Solna (SE); Jonas Fröberg Olsson, Ljungsbro (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 580 days.

(21) Appl. No.: 17/920,217

(22) PCT Filed: Apr. 20, 2021

(86) PCT No.: PCT/IB2021/053265
§ 371 (c)(1),
(2) Date: Oct. 20, 2022

(87) PCT Pub. No.: WO2021/214666
PCT Pub. Date: Oct. 28, 2021

(65) Prior Publication Data
US 2023/0180221 A1      Jun. 8, 2023

Related U.S. Application Data

(60) Provisional application No. 63/012,471, filed on Apr. 20, 2020.

(51) Int. Cl.
*H04W 72/1268*       (2023.01)
*H04W 72/566*        (2023.01)

(52) U.S. Cl.
CPC ..... *H04W 72/1268* (2013.01); *H04W 72/566* (2023.01)

(58) Field of Classification Search
CPC ........... H04W 72/1268; H04W 72/566; H04W 72/569; H04W 72/02
See application file for complete search history.

(56) References Cited

U.S. PATENT DOCUMENTS

2018/0146470 A1*    5/2018  Wu ........................ H04W 72/20
2020/0145164 A1*    5/2020  Cheng ................. H04W 52/265
(Continued)

FOREIGN PATENT DOCUMENTS

WO      WO-2019107151 A1 *  6/2019  ............... H04B 7/06
WO      WO-2020033395 A1 *  2/2020  .......... H04W 74/004

OTHER PUBLICATIONS

Ericsson, "Remaining issues on Intra-UE prioritization and multi-plexing", 3GPP TSG-RAN WG2 #109bis-e, R2-2002710, Apr. 20-30, 2020, Electronic.
(Continued)

*Primary Examiner* — Ankur Jain

(57)       ABSTRACT

Embodiments under the present disclosure include systems and methods for prioritization for SR and PUSCH without LCH association. For example, certain embodiments can comprise a method performed by a wireless device for priority handling of SR and PUSCH without LCH association. The method can comprise the wireless device determining that the SR and PUSCH are not related to a LCH and determining a priority of the SR and PUSCH.

17 Claims, 11 Drawing Sheets

(56)         References Cited

U.S. PATENT DOCUMENTS

| 2020/0236582 | A1* | 7/2020 | Chin | ..................... | H04W 72/23 |
| 2020/0314722 | A1* | 10/2020 | Kyung | ............... | H04W 72/569 |

OTHER PUBLICATIONS

Zte et al., "Remaining issues on the collision case between SR and PUSCH", 3GPP TSG-RAN WG2 #109 E-meeting BIS, R2-2003591, 2020.

3rd Generation Partnership Project, "3rd Generation Partnership Project; Technical Specification Group Radio Access Network; NR; Medium Access Control (MAC) protocol specification (Release 15)": Technical Specification, 3GPP TS 38.321 V15.12.0, pp. 1-79, Mar. 2021, 3GPP, France.

Ericsson, "Remaining details of intra-UE prioritization", 3GPP TSG-RAN WG2 #109e, Electronic meeting, Feb. 24-Mar. 6, 2020, pp. 1-8, Tdoc R2-2000797 (Revision of R2-1914758), 3GPP.

Nokia et al., "Priority of SR Triggered by MAC CE", Summary of e-mail discussion: [Post109e#S0][IIOT] Remaining issues intra-UE prioritization, Electronic meeting, Apr. 20-30, 2020, pp. 1-38, R2-2003226, 3GPP.

Samsung, "Priority of SR Triggered by MAC CE", 3GPP TSG-RAN WG2 Meeting #109bis-e, Electronic meeting, Apr. 20-30, 2020, pp. 1-2, R2-2002941, 3GPP.

Ericsson, "On interaction between LCH-based and PHY-based prioritization", 3GPP TSG-RAN WG2 #110-e, R2-2004959, Jun. 1-Jun. 12, 2020, 3 Pages, Electronic.

VIVO, "Remaining MAC issues", 3GPP TSG-RAN WG2 Meeting #110 electronic, R2-2005297, Jun. 1-Jun. 12, 2020, 18 Pages, Online.

Zte, et al., "Remaining issues on intra-UE multiplexing involved SR", 3GPP TSG-RAN WG2 #110 E-meeting, R2-2005124, Jun. 1-Jun. 12, 2020, 3 Pages, Online.

* cited by examiner

1200

1202

Start

Configuring a wireless device to determine a priority of the SR and PUSCH when the SR and PUSCH are not related to a LCH End 1300
Virtual Apparatus 1310
Configuring Module

PRIORITIZATION FOR SCHEDULING REQUEST AND PHYSICAL UPLINK SHARED CHANNEL WITHOUT LOGICAL CHANNEL ASSOCIATION

This present application is a 371 of International Application No. PCT/IB2021/053265 filed on Apr. 20, 2021 which claims the benefit of U.S. Provisional Application No. 63/012,471 filed on Apr. 20, 2020, the disclosures of which are hereby incorporated herein by reference in their entirety.

TECHNICAL FIELD

The present disclosure relates, in general, to wireless communications and, more particularly, systems and methods for prioritization for scheduling request (SR) and physical uplink shared channel (PUSCH) without Logical Channel (LCH) association.

BACKGROUND

A configured grant is always overridden by an overlapping dynamic grant. However, when a gNodeB (gNB) has to allocate a short periodicity configured grant to accommodate sporadic low-latency critical traffic, a non-robust dynamic grant might overlap with a robust configured grant which can lead to dropping of critical traffic transmission. Therefore, there is a need for a tool to protect critical uplink configured grant transmission.

Non-critical uplink data transmissions may overlap with uplink control information for critical traffic, i.e. scheduling request (SR) or hybrid automatic repeat request (HARQ) acknowledgments (ACKs). Due to this, SR for critical transmission can be delayed because it can be too late to include information about critical traffic in a buffer status report (BSR). Moreover, BSR reception takes a longer time compared to short SR. From HARQ-ACK perspective, the situation is similar. Either HARQ-ACK reliability or latency can be affected due to multiplexing of uplink control information (UCI) on physical uplink shared channel (PUSCH).

Non-critical and critical traffic uplink control information can be in conflict. For example, a critical SR or HARQ-ACK may come during a transmission of long physical uplink control channel (PUCCH) with channel state information (CSI) report.

Intra-UE prioritization feature spans both physical (PHY) and medium access control (MAC) operations for prioritization between time-overlapping uplink transmissions. On PHY, there has been an introduction of PHY priority index and introduction of PHY prioritization between uplink transmissions of different PHY priority index; on MAC, there has been enhanced prioritization between dynamic grant and configured grant and enhanced logical channel prioritization (LCP) rules.

The general principle of the prioritization is that MAC performs prioritization between uplink grants (both dynamic and configure-grants) and SRs based on LCH priority and signaled/configured PHY priority index, then triggers PHY to make a selected transmission. PHY then continues the intra-UE prioritization process and prioritizes uplink signals based on PHY priority index and instructions from MAC.

From MAC point of view, when addressing resource conflict between uplink grants, two scenarios can be considered:

1. Selection case: In the case when no MAC protocol data unit (PDU) has been generated and there are overlapping grants where one will be de-prioritized (assuming there are data available for both grants), only one MAC PDU is generated.

2. Pre-emption case: In the case when one MAC PDU has been generated and there is an overlapping grant which is considered have a higher priority, this MAC PDU is delivered to PHY for transmission and the previous delivered MAC PDU is supposed to be de-prioritized in PHY layer.

A similar scenario split applies for the resource conflict between SR and uplink grant.

1. Selection case: In this case, the MAC PDU for the grant is not built yet and assumes there is data available for the grant. If the grant is de-prioritized, the MAC PDU is not generated but SR is sent. If the grant is prioritized, the MAC PDU is generated and MAC refrains from transmission of SR on this overlapping PUCCH resource with the uplink-grant.

2. Pre-emption case: In the case when the MAC PDU has been generated and there is an overlapping SR which has considered have a higher priority, this MAC PDU is delivered to PHY for transmission and the previous delivered MAC PDU is supposed to be de-prioritized in PHY layer. In the case where the overlapping SR has a lower priority, MAC refrain from transmission of SR on this overlapping PUCCH resource with the uplink-grant.

From MAC point of view, the priority of a grant is determined by the highest priority among priorities of the logical channel with data available that are multiplexed (corresponding to the pre-emption case) or can be multiplexed (corresponding to the selection case) in the MAC PDU, according to the LCP restriction. Similarly, the LCH-based priority of the SR is the priority of the logical channel that triggered the SR. This means that when no data is multiplexed or can be multiplexed on the grant, either due to no data arrival or LCP restriction, this grant has a lower priority than any other grants that have data multiplexed or can be multiplexed. This can be collectively called LCH-based priority of a grant or SR.

From PHY point of view, the selection case is filtered out by the MAC and the only case it needs to address is the above pre-emption case.

To further facilitate priority, a two-level PHY-index-based priority of a grant or SR is used, which can either be indicated in downlink control information (DCI) or radio resource control (RRC):

A scheduling request configuration may have a PHY priority index indication as an RRC field in SR resource configuration: For HARQ-ACK, PHY priority index may be indicated in DL DCI (Format 1_1 and 1_2) for dynamic assignments while for SPS the PHY priority index may be indicated by RRC configuration. For PUSCH: for DG (Dynamic Grant) PHY priority index may be indicated in UL DCI (Format 0_1 and 0_2) and for CG the PHY priority index may be indicated by CG configuration.

A-periodic and semi-persistent CSI on PUSCH: PHY priority index may be indicated in UL DCI (Format 0_1 and 0_2)

There currently exist certain challenges. For example, in the MAC layer the priority of a grant or SR should be determined based on the LCH priority among the conflicting grants. However, there are cases in which the intra-UE prioritization based on LCH-based priority determination cannot address and lead to conflicting outcomes if PHY-index-based priority of the physical resources are considered.

One example, which may be referred to as Example A, is that it is unknown whether MAC CEs conveyed by a grant should be considered for prioritization, because MAC CE is not from LCH and hence is not associated to a priority level. The candidate proposals include to ignore the MAC CE in the prioritization. Some MAC CEs might need further clarification. BSR MAC CE is triggered by new data arrival from an LCH and a priority based on this LCH can be re-used. Some newly introduced Rel-16 MAC CE, e.g., BFR and LBT Failure MAC CE, can also trigger SR if they cannot be transmitted. It is then not clear the associated priority of the SR from MAC point of view.

Some other examples are related to the generated MAC PDU with only padding bits. The MAC spec 3GPP TS 38.321 describes the allocation of resources as follows. The MAC entity shall not generate a MAC PDU for the HARQ entity if the MAC entity is configured with skip UplinkTx-Dynamic with value true and the grant indicated to the HARQ entity was addressed to a C-RNTI, or the grant indicated to the HARQ entity is a configured uplink grant; and (a) there is no aperiodic CSI requested for this PUSCH transmission as specified in TS 38.212 [9]; (b) the MAC PDU includes zero MAC SDUs; and (c) the MAC PDU includes only the periodic BSR and there is no data available for any LCG, or the MAC PDU includes only the padding BSR.

From the description above, if there is aperiodic CSI requested for this PUSCH transmission and the other three conditions above are satisfied, then a MAC PDU with padding bits only are also generated. This may be referred to herein as Example B.

If the MAC entity is NOT configured with skipUplinkTx-Dynamic, then a MAC PDU with padding bits is generated. This may be referred to herein as Example C.

Yet another example is configured grant activation confirmation MAC CE. In Rel-16, a new multi-bit confirmation MAC CE to confirm activation of multiple configured grant. Because each of the configured grants may have different (PHY) priority index as well as be associated with different LCHs of different LCH-priority.

SUMMARY

To address the foregoing problems with existing solutions, disclosed is systems and methods for prioritization for SR and PUSCH without LCH association.

According to certain embodiments, a method by a wireless device for priority handling of SR and PUSCH without LCH association is provided. The wireless device determines that the SR and PUSCH are not related to a LCH and determines a priority of the SR and PUSCH.

According to certain embodiments, a wireless device for priority handling of SR and PUSCH without LCH association includes processing circuitry configured to determine that the SR and PUSCH are not related to a LCH and determine a priority of the SR and PUSCH.

According to certain embodiments, a method by a network node for configuring a wireless device for priority handling of SR and PUSCH without LCH association includes configuring the wireless device to determine a priority of the SR and PUSCH when the SR and PUSCH are not related to a LCH.

According to certain embodiments, a network node for configuring a wireless device for priority handling of SR and PUSCH without LCH association includes processing circuitry configured to configure the wireless device to determine a priority of the SR and PUSCH when the SR and PUSCH are not related to a LCH Certain embodiments of the present disclosure may provide one or more technical advantages. For example, certain embodiments may provide a clear prioritization rule between the uplink transmission without LCH association and the uplink transmission with LCH association. Another advantage may be that such a prioritization rule considers the importance of the uplink transmission not only by the to-be-transmitted data but also the PHY layer priority of the transmission and the reason that triggered the uplink transmission. Still another advantage may be that such a prioritization rule prioritizes the chance of being successfully transmitted over what can be transmitted, so that the UE may discard a transmission with more important data (e.g., high LCH priority) if the transmission would fail with a high probability.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
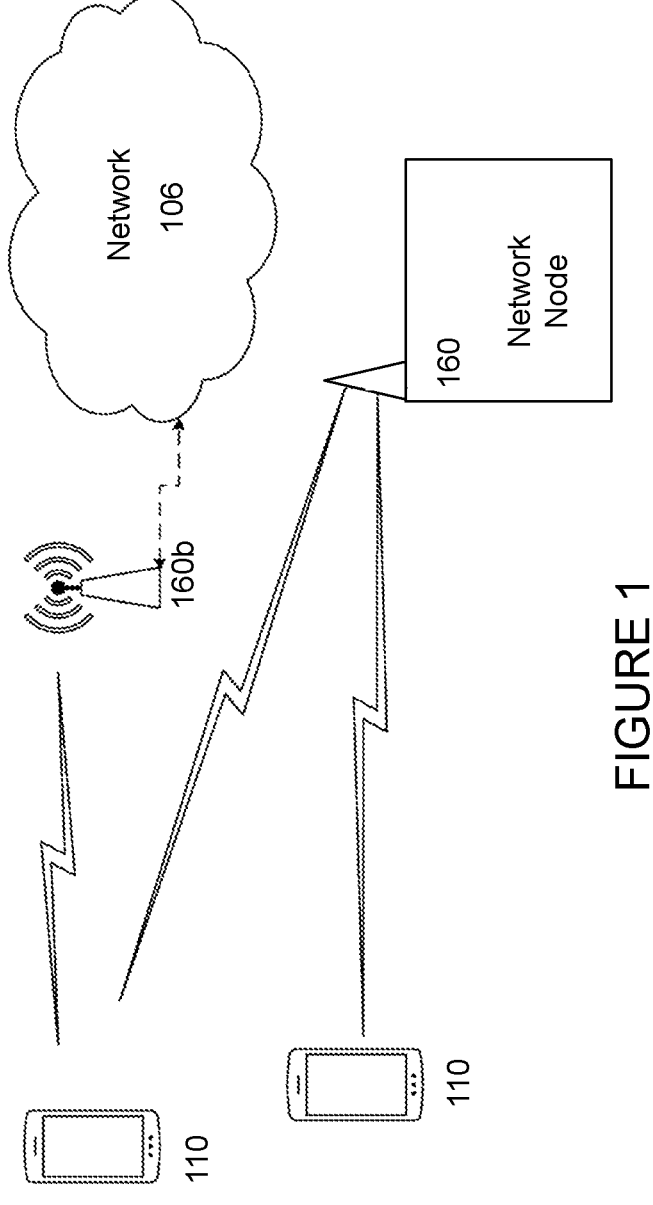
FIG. 1 illustrates an example wireless network, according to certain embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Because a user equipment (UE) for industrial use cases may process traffic flows originated by different applications/devices simultaneously, the intra-UE prioritization/multiplexing issues considering downlink/uplink resource collision involving data/control channels and dynamic/configured assignments/grants is included as part of the enhanced ultra-reliable low-latency communication (eURLLC) and industrial Internet-of-Things (IIoT) specifications. With these features, traffic flows with different priorities within a UE can be appropriately handled to fulfil the respective quality of service (QoS) requirements.

As described above, there currently exist certain challenges with priority for some medium access control (MAC) control elements (CEs). Particular embodiments obviate the problems described above. For example, in a first group of embodiments, if the priority of the SR/PUSCH has no clear relation to any LCH, LCH-based priority is not considered in the MAC but rather MAC considers PHY-index-based priority of the SR and PUSCH.

Note that, the priority of the SR associated with the two MAC CEs, BFR MAC CE and LBT failure MAC CE is configured in the RRC IE (MAC-CellGroupConfig), i.e., schedulingRequestID-LBT-SCell-r16 SchedulingRequestId OPTIONAL,—Need M schedulingRequestID-BFR-SCell-r16 SchedulingRequestId OPTIONAL—Need R More precisely, for example A, if the Scheduling Request Resource Config associated with the schedulingRequestId is high (i.e., high PHY-index-based priority) and the other overlapping resource's PHY-index-based priority is low, then the triggered SR has a higher priority. Otherwise, the triggered SR has a lower priority. This has considered that SR when colliding with the same PHY-index priority PUSCH resources, it is deprioritized.

For example B, as long as the PHY-index priority for the aperiodic CSI report is high, then this grant is always prioritized, according to certain embodiments. If the PHY-index priority for the aperiodic CSI report is low but the other overlapping resources have low PHY-index priority too, then this grant is also prioritized. This has considered that dynamic grant overrides configured grant with same PHY-index priority. The same can apply for the example C.

As an alternative for example B and C, the MAC PDU is always de-prioritized in MAC because it carries no useful information, according to certain embodiments. One implementation in the specification can be to specify that the grant with MAC PDU in which only padding is included always has the lowest LCH-based-priority.

In a second group of embodiments, the LCH-based-priority of the SR associated with the two MAC CEs, BFR MAC CE and LBT failure MAC CE is associated with the "LCH-priority" of the MAC CE during priority comparison between LCH and MAC CE in the intra-UE prioritization.

According to certain embodiments, in a first method, the MAC CE follows the priority order in the clause 5.4.3.1.3 of MAC spec TS 38.321, which is described as follows. Logical channels shall be prioritised in accordance with the following order (highest priority listed first):

C-RNTI MAC CE or data from UL-CCCH;

Configured Grant Confirmation MAC CE or BFR MAC CE or Multiple Entry Configured Grant Confirmation MAC CE;

Sidelink Configured Grant Confirmation MAC CE;

LBT failure MAC CE;

MAC CE for SL-BSR prioritized according to clause 5.22.1.6;

MAC CE for BSR, with exception of BSR included for padding;

Single Entry PHR MAC CE or Multiple Entry PHR MAC CE;

MAC CE for the number of Desired Guard Symbols;

MAC CE for Pre-emptive BSR;

MAC CE for SL-BSR, with exception of SL-BSR prioritized according to clause 5.22.1.6 and SL-BSR included for padding;

data from any Logical Channel, except data from UL-CCCH;

MAC CE for Recommended bit rate query;

MAC CE for BSR included for padding;

MAC CE for SL-BSR included for padding.

NOTE 2: Prioritization between Configured Grant Confirmation MAC CE and BFR MAC CE is up to UE implementation According to certain embodiments, in a second method, the MAC CE is always considered to have lower LCH-based-priority than any LCH data.

In a particular embodiment that may be considered an extension of the second method, the MAC PDU with only aperiodic CSI report is also assigned an LCH-based-priority in the above table and two methods (prioritized according to MAC CE priority or always considered as the lowest priority) can be applied. For example, in method 1, PUSCH with aperiodic CSI can be considered to have the priority as LBT failure MAC CE. In the method 2, the padding with aperiodic CSI report is considered to have the lowest LCH-priority.

In other embodiments, since they are all considered as lowest LCH priority, only some network configurations make sense. This is to avoid that the high PHY-index priority resources are de-prioritized in the MAC compared to the low PHY-index priority resources. For example, in some network implementation, their associated physical resources are always configured with low PHY-index priority, e.g., SRs associated with the LBT failure MAC CE and BFR MAC CE are low PHY-index priority. In some other network implementation, if the network configures their associated physical resources to have high PHY-index priority, then they do not overlap with other PHY resources.

According to certain embodiments, the above network implementation applies for semi-persistent CSI report on PUSCH. The reason is: PHY-index priority of the semi-persistent CSI report on PUSCH is the same as the DCI that schedules its transmission, however the transmission of this semi-persistent CSI report on PUSCH is not visible in MAC (which makes it essentially the lowest LCH-based priority).

In particular embodiments, a configured grant activation confirmation MAC CE is considered to have same priority as the LCH priority of the LCH with lowest LCH priority that can be mapped on the configured grant. In other example, if P is the priority of the LCH with lowest LCH priority that can be mapped on the configured grant, then the configured grant activation confirmation MAC CE is considered to have priority P−1.

In an embodiment when UE is configured with multiple configured grants and UE confirms activation using multi-bit MAC-CE for confirmation, then priority of the multi-bit MAC-CE is determined as priority P or P−1, where P is the lowest priority of the LCHs that can be mapped on the configured grants indicated as active in the multi-bit MAC CE.

FIG. 1 illustrates a wireless network, in accordance with some embodiments.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 2:
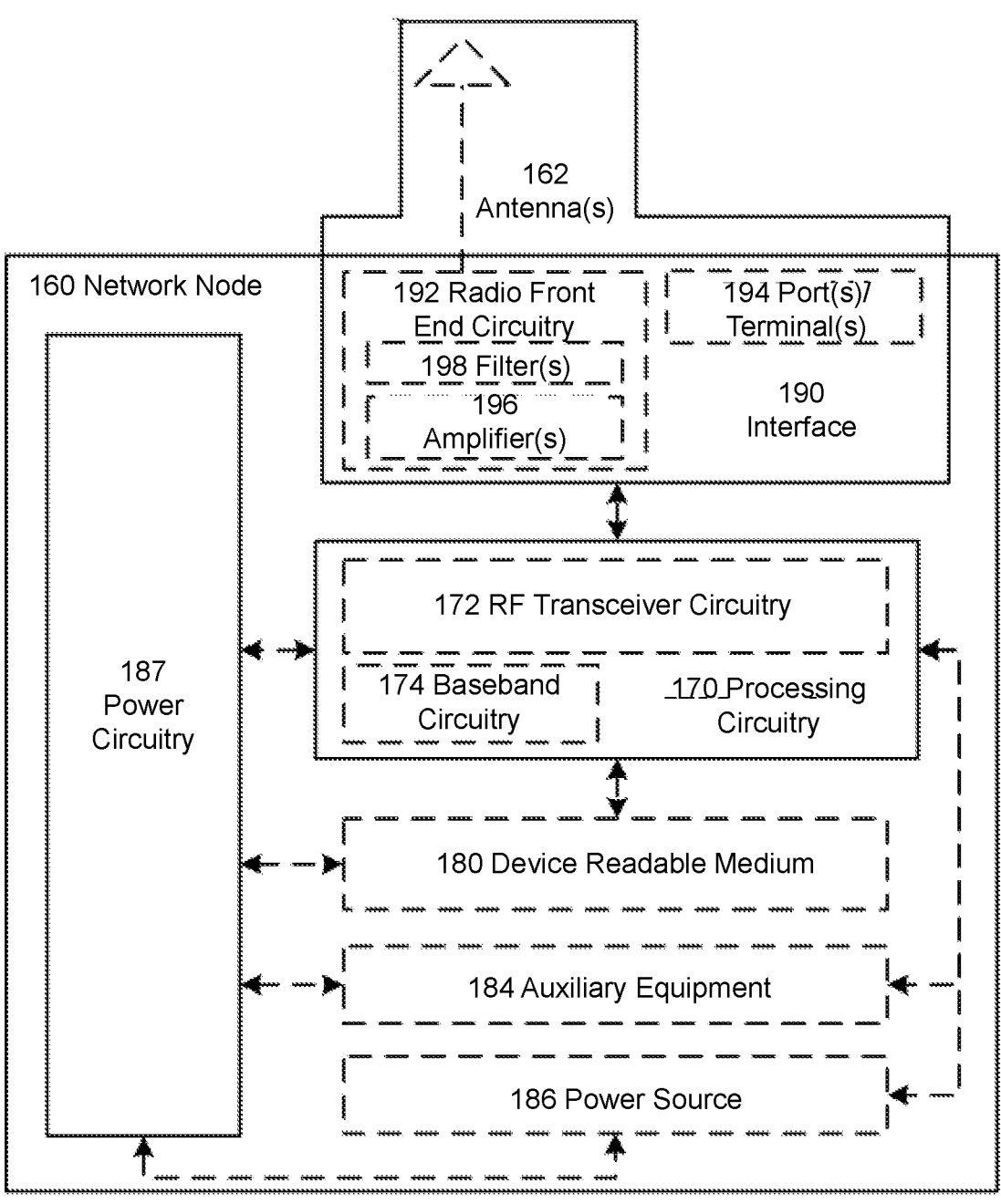
FIG. 2 illustrates an example network node, according to certain embodiments.

FIG. 2 illustrates a network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 2 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 3:
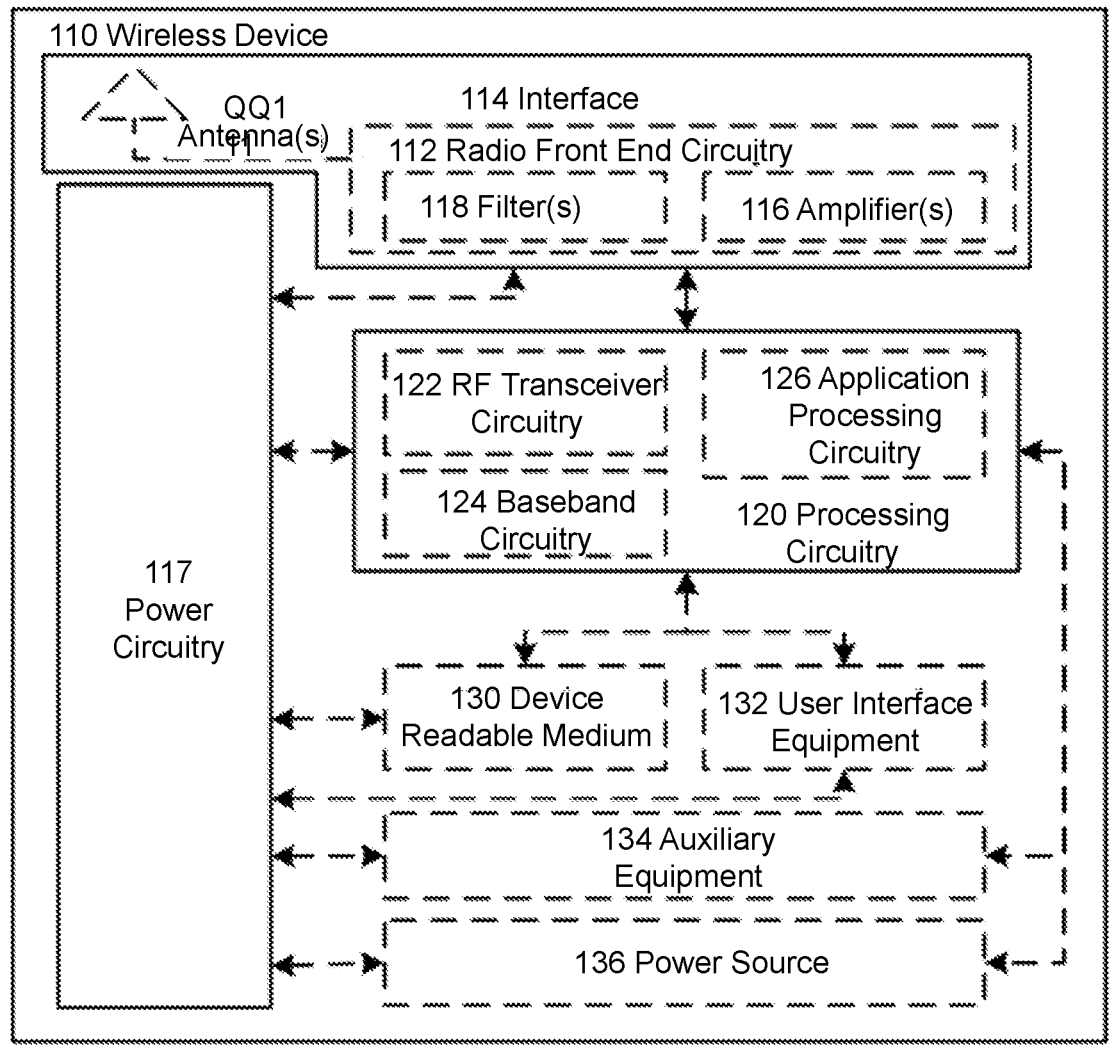
FIG. 3 illustrates an example wireless device, according to certain embodiments.

FIG. 3 illustrates an example wireless device, according to certain embodiments. As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 4:
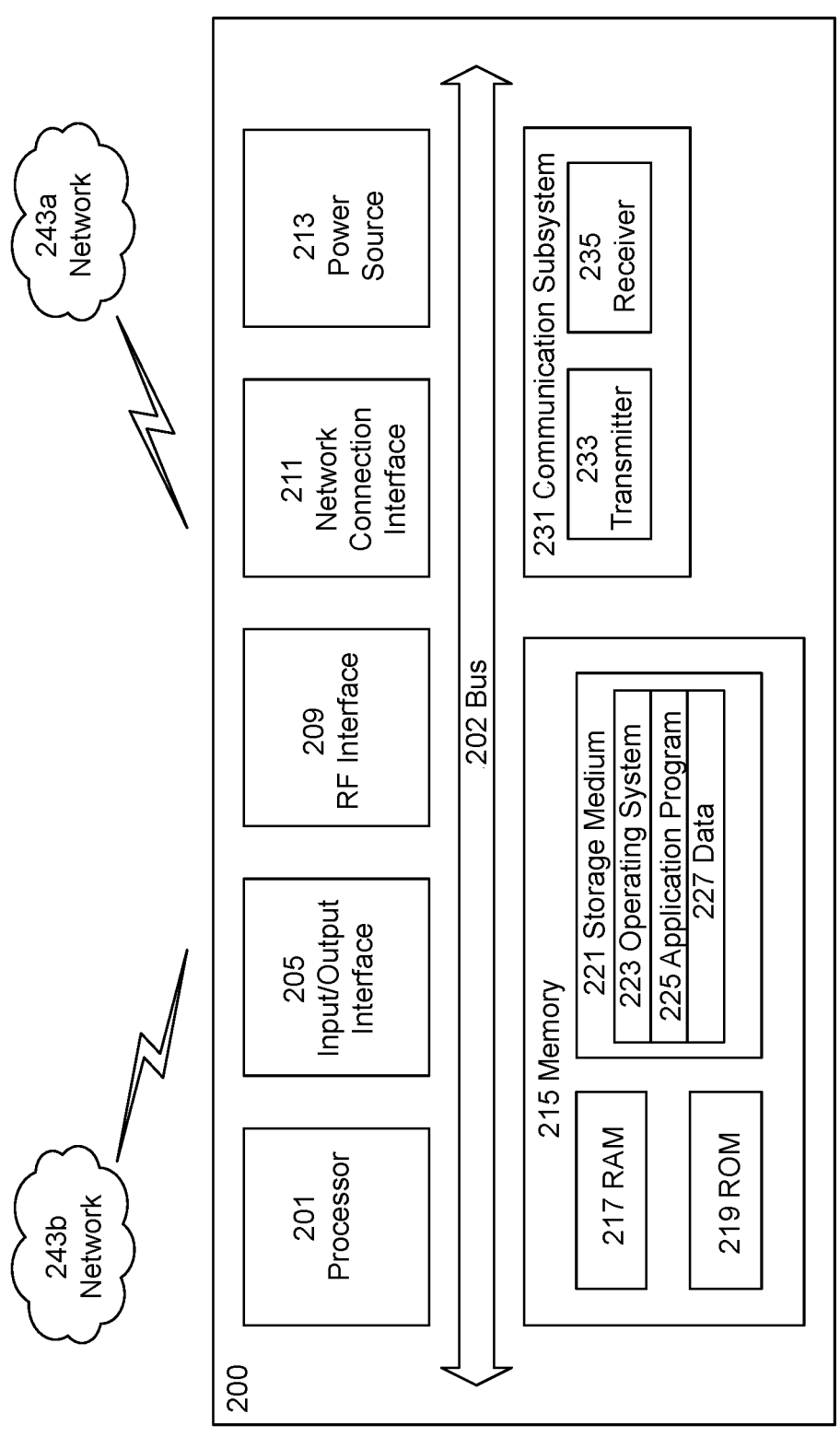
FIG. 4 illustrate an example user equipment, according to certain embodiments.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 4, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 4 is a UE, the components discussed herein are equally applicable to a WD, and vice-versa.

In FIG. 4, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The data transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 4, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 5:
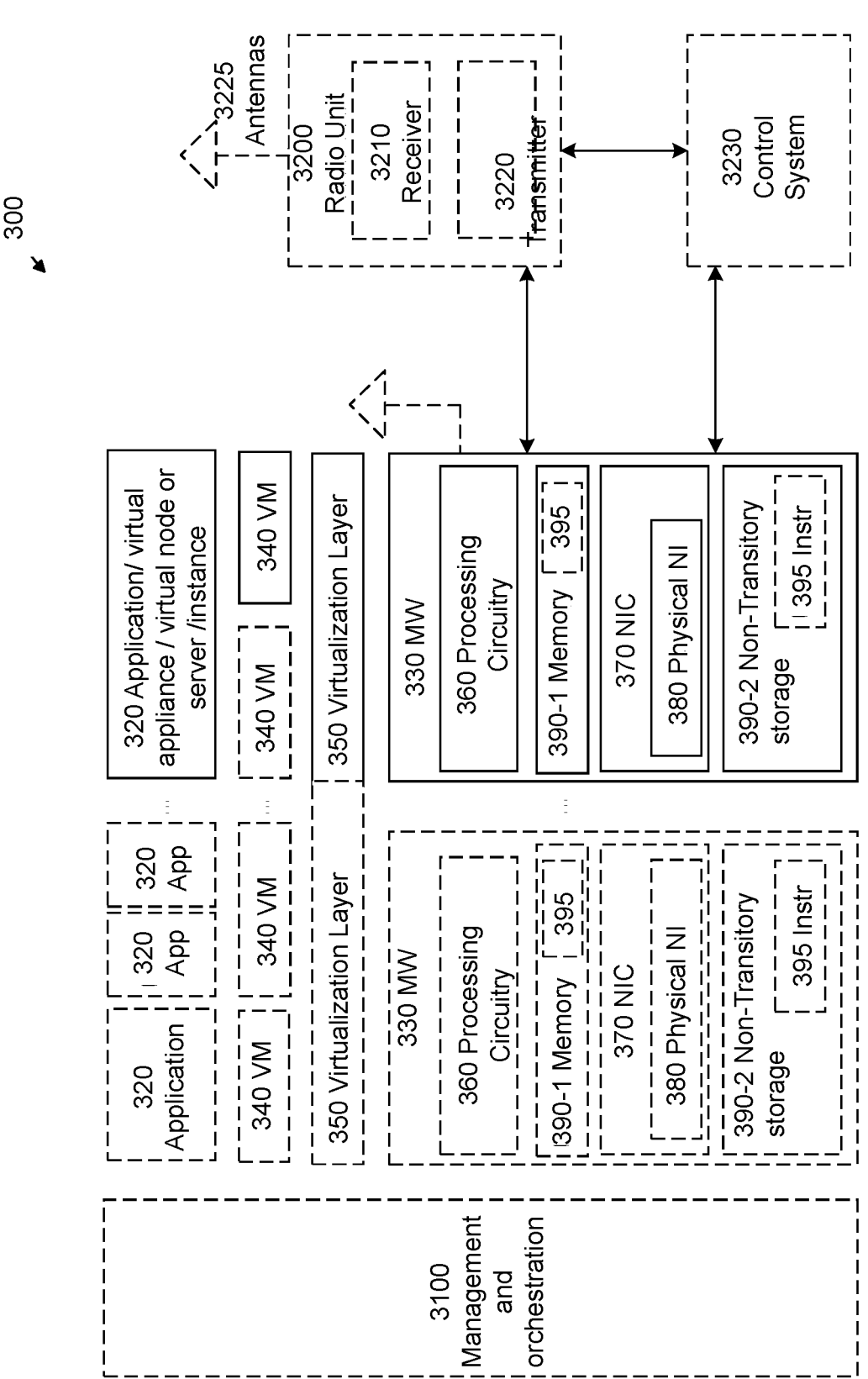
FIG. 5 illustrates a virtualization environment in which functions implemented by some embodiments may be virtualized, according to certain embodiments.

FIG. 5 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 5, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 5.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 6:
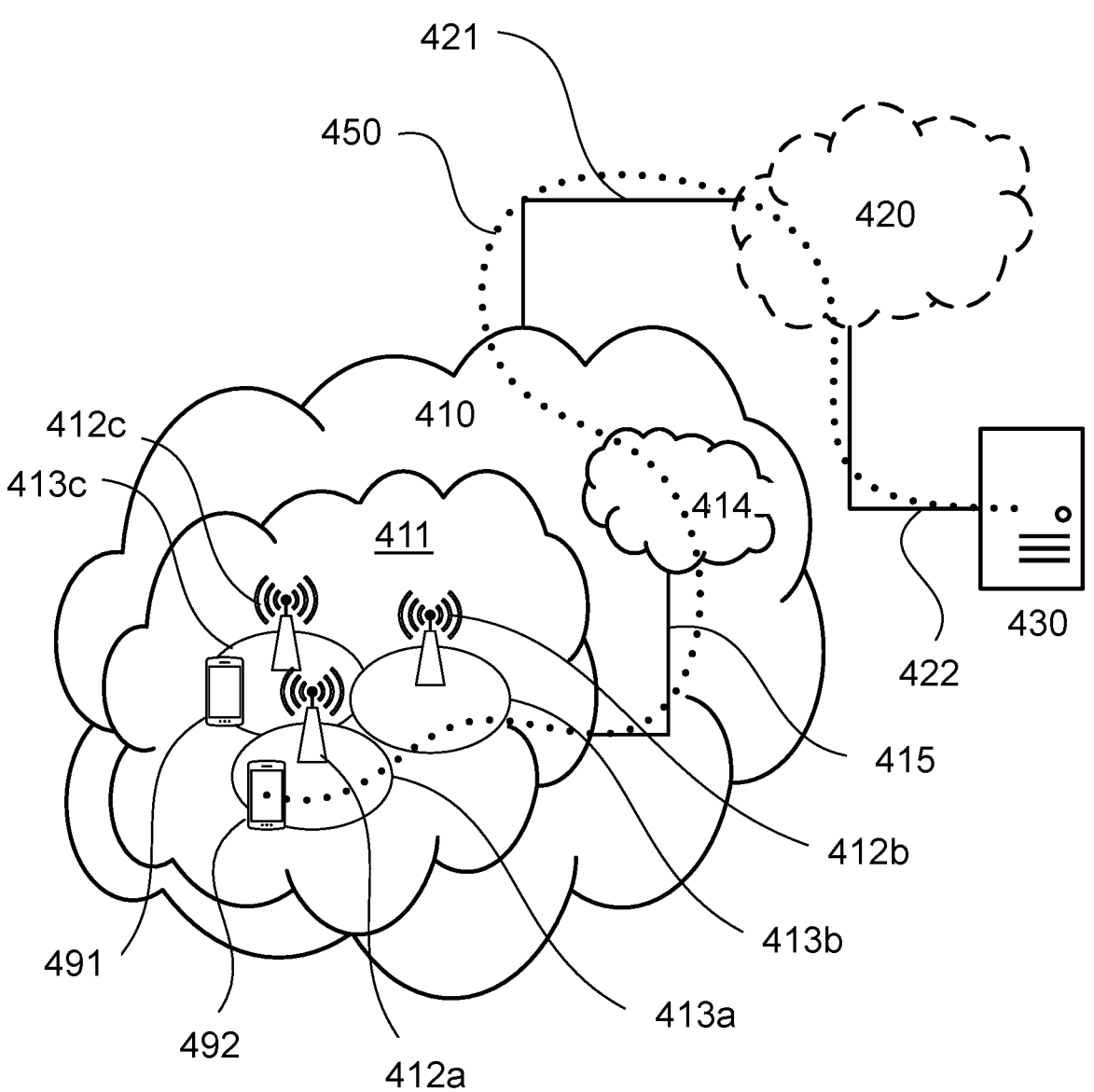
FIG. 6 illustrates a telecommunication network connected via an intermediate network to a host computer, according to certain embodiments.

FIG. 6 illustrates a telecommunication network connected via an intermediate network to a host computer, in accordance with some embodiments.

With reference to FIG. 6, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 6 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 7:
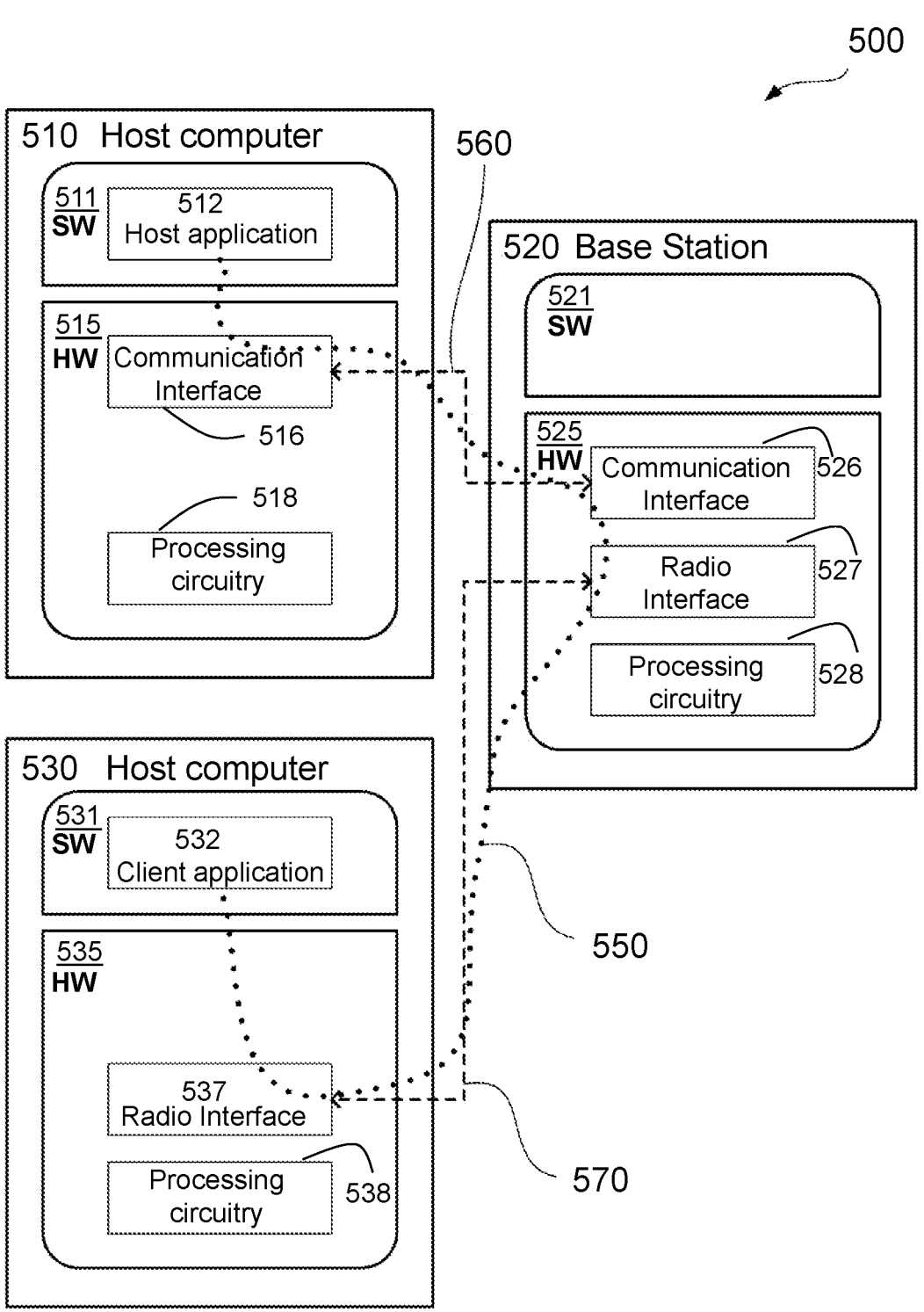
FIG. 7 illustrates a generalized block diagram of a host computer communicating via a base station with a user equipment over a partially wireless connection, according to certain embodiments.

FIG. 7 illustrates a host computer communicating via a base station with a user equipment over a partially wireless connection, in accordance with some embodiments.

Example implementations, in accordance with an embodiment, of the UE, base station and host computer discussed in the preceding paragraphs will now be described with reference to FIG. 7. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 7) served by base station 520. Communication interface 526 may be configured to facilitate connection 560 to host computer 510. Connection 560 may be direct or it may pass through a core network (not shown in FIG. 7) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 7 may be similar or identical to host computer 430, one of base stations 412a, 412b, 412c and one of UEs 491, 492 of FIG. 6, respectively. This is to say, the inner workings of these entities may be as shown in FIG. 7 and independently, the surrounding network topology may be that of FIG. 6.

In FIG. 7, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 8, 9:
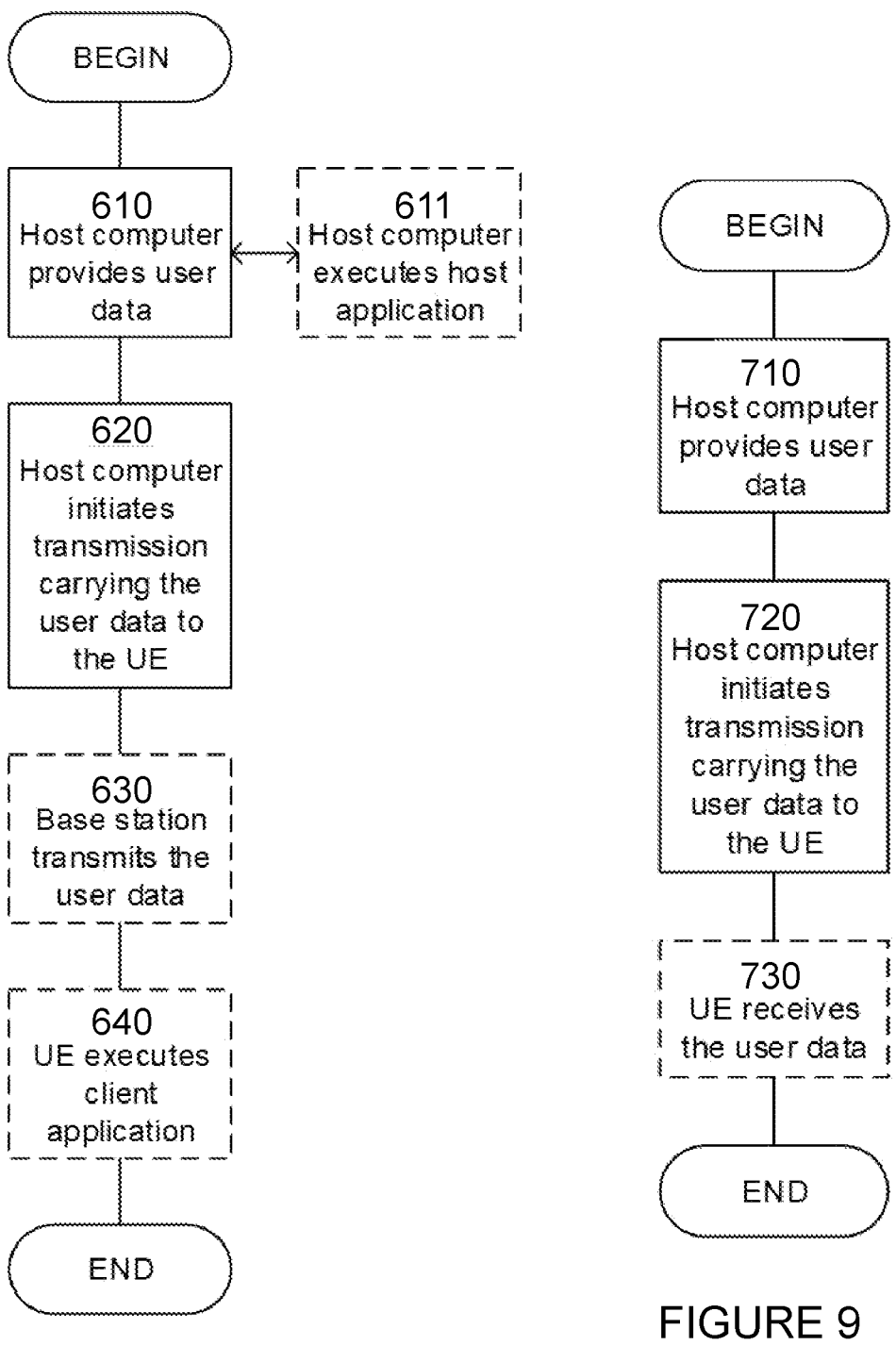
FIG. 8 illustrates a method implemented in a communication system, according to one embodiment.
FIG. 9 illustrates another method implemented in a communication system, according to one embodiment.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 10, 11:
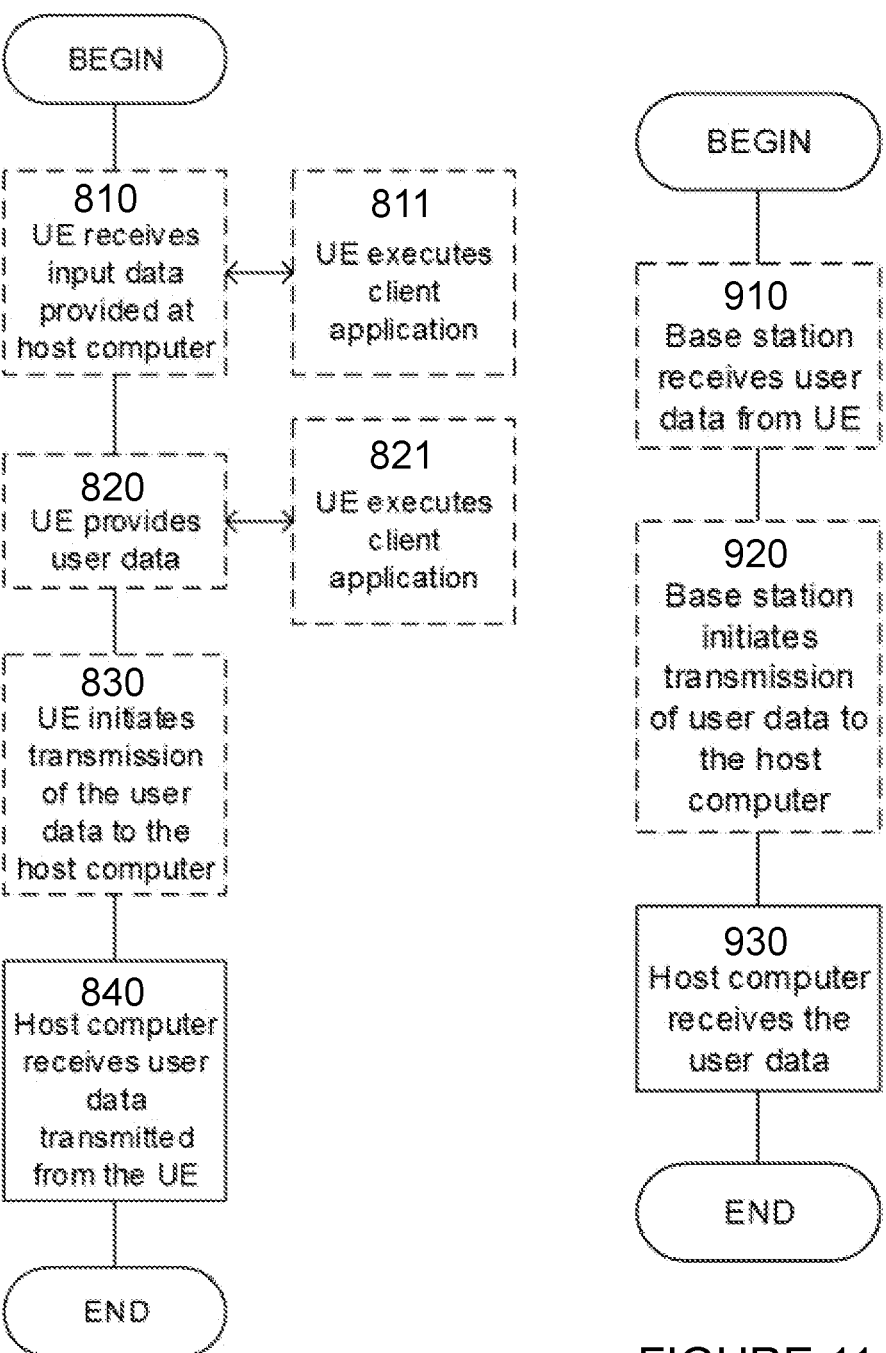
FIG. 10 illustrates another method implemented in a communication system, according to one embodiment.
FIG. 11 illustrates another method implemented in a communication system, according to one embodiment.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 12:
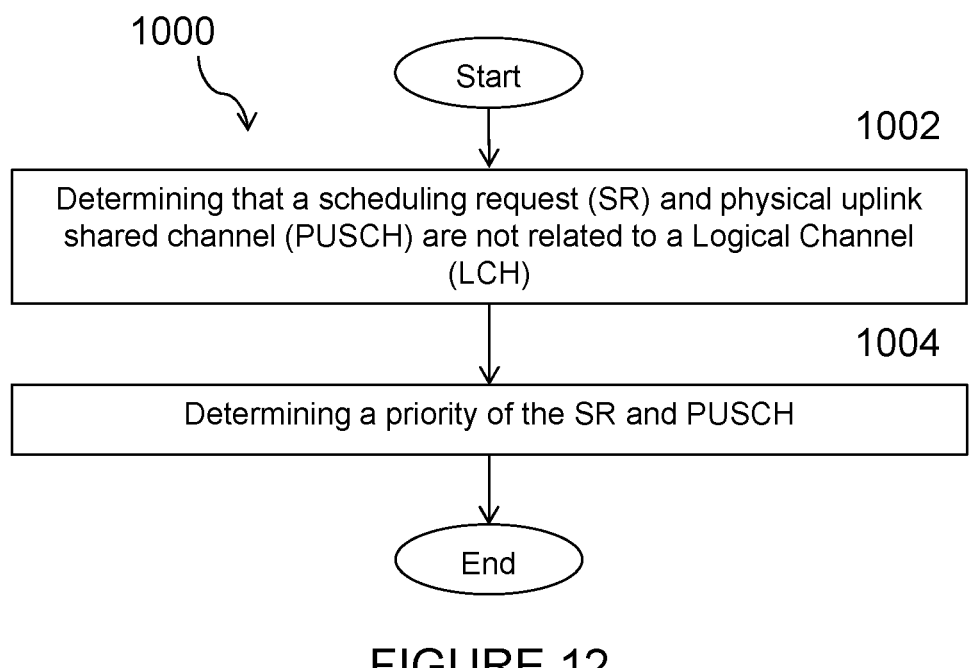
FIG. 12 illustrates an example method by a wireless device, according to certain embodiments.

FIG. 12 depicts a method 1000 by a wireless device 110 for priority handling of SR and PUSCH without LCH association, according to certain embodiments. At step 1002, the wireless device 110 determines that the SR and PUSCH are not related to a LCH. At step 1004, the wireless device 110 determines a priority of the SR and PUSCH.

In a particular embodiment, the priority of the SR and PUSCH is determined based on a priority of at least one MAC CE.

In a particular embodiment, the MAC CE comprises at least one of a BFR MAC CE or a LBT failure MAC CE.

In a particular embodiment, the wireless device receives the priority of at least one MAC CE in a RRC IE.

In a particular embodiment, the priority of the SR and PUSCH is determined based on a physical-index-based priority of the SR and PUSCH.

In a particular embodiment, the wireless device receives the physical-index-based priority of the SR and PUSCH in a RRC IE.

In a particular embodiment, the wireless device receives the priority of the PUSCH associated with an aperiodic CSI report in a RRC IE.

In a particular embodiment, the priority of the SR and PUSCH is determined to be a high priority, and the wireless device prioritizes the SR and PUSCH over an overlapping resource that has a lower priority than the high priority of the SR and PUSCH.

In a particular embodiment, the wireless device prioritizes the SR and PUSCH over a grant associated with a MAC PDU that includes only padding.

In various particular embodiments, the method may additionally or alternatively include one or more of the steps or features of the Group A and Group C Example Embodiments described below.

Figure 13:
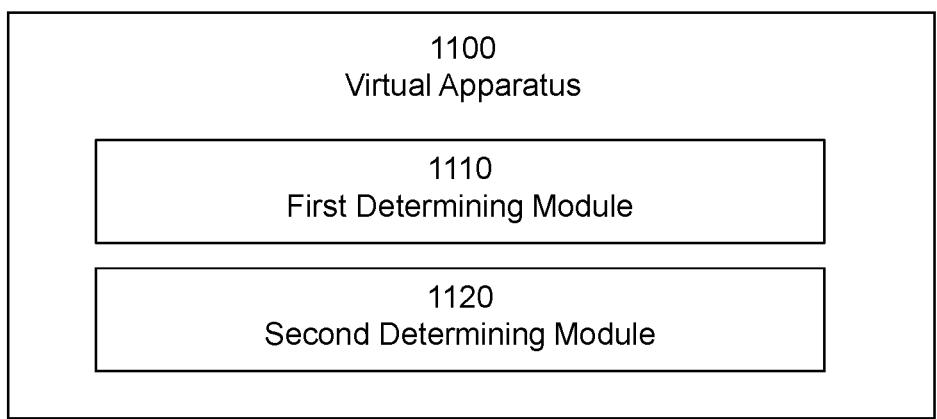
FIG. 13 illustrates an example virtual apparatus, according to certain embodiments.

FIG. 13 illustrates a schematic block diagram of a virtual apparatus 1100 in a wireless network (for example, the wireless network shown in FIG. 1). The apparatus may be implemented in a wireless device or network node (e.g., wireless device 110 or network node 160 shown in FIG. 1). Apparatus 1100 is operable to carry out the example method described with reference to FIG. 12 and possibly any other processes or methods disclosed herein. It is also to be understood that the method of FIG. 12 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first determining module 1110, second determining module 1120, and any other suitable units of apparatus 1100 to perform corresponding functions according one or more embodiments of the present disclosure.

According to certain embodiments, first determining module 1110 may perform certain of the determining functions of the apparatus 1100. For example, first determining module 1110 may determine that the SR and PUSCH are not related to a LCH.

According to certain embodiments, second determining module 1120 may perform certain other of the determining functions of the apparatus 1100. For example, second determining module 1120 may determine a priority of the SR and PUSCH.

Optionally, in particular embodiments, virtual apparatus may additionally include one or more modules for performing any of the steps or providing any of the features described above with regard to FIG. 12 and/or described below with regard to the Group A and Group C Example Embodiments.

As used herein, the term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 14:
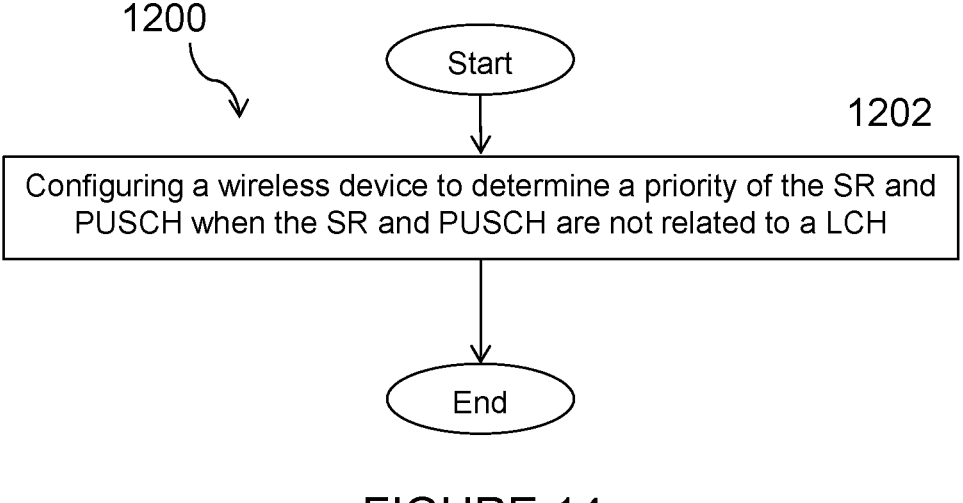
FIG. 14 illustrates an example method by a network node, according to certain embodiments.

FIG. 14 depicts a method 1200 by a network node 160 for configuring a wireless device for priority handling of SR and PUSCH without LCH association, according to certain embodiments. At step 1202, the network node 160 configures the wireless device to determine a priority of the SR and PUSCH when the SR and PUSCH are not related to a LCH.

In a particular embodiment, the priority of the SR and PUSCH is determined based on a priority of at least one MAC CE.

In a particular embodiment, the MAC CE comprises at least one of a BFR MAC CE or a LBT failure MAC CE.

In a particular embodiment, the network node transmits the priority of at least one MAC CE in a RRC IE.

In a particular embodiment, the priority of the SR and PUSCH is determined based on a physical-index-based priority of the SR and PUSCH.

In a particular embodiment, the network node transmits the physical-index-based priority of the SR and PUSCH in a RRC IE.

In a particular embodiment, the network node transmits the priority of the PUSCH associated with an aperiodic CSI report in a RRC IE.

In a particular embodiment, the network node configures the wireless device to prioritize the SR and PUSCH over an overlapping resource when the priority of the SR and PUSCH is determined to be of a higher priority than the a priority of the overlapping resource.

In a particular embodiment, the network node configures the wireless device to prioritize the SR and PUSCH over a grant associated with a MAC PDU that includes only padding.

In various particular embodiments, the method may include one or more of any of the steps or features of the Group B and Group C Example Embodiments described below.

Figure 15:
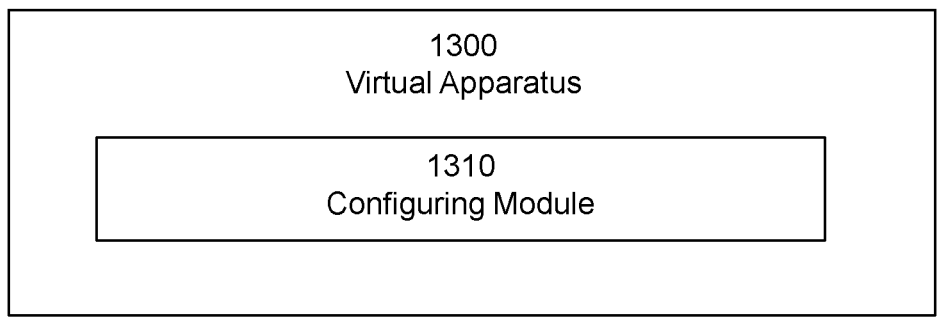
FIG. 15 illustrates another example virtual apparatus, according to certain embodiments.

FIG. 15 illustrates a schematic block diagram of a virtual apparatus 1300 in a wireless network (for example, the wireless network shown in FIG. 1). The apparatus may be implemented in a wireless device or network node (e.g., wireless device 110 or network node 160 shown in FIG. 1). Apparatus 1300 is operable to carry out the example method described with reference to FIG. 14 and possibly any other processes or methods disclosed herein. It is also to be understood that the method of FIG. 14 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause configuring module 1310 and any other suitable units of apparatus 1300 to perform corresponding functions according one or more embodiments of the present disclosure.

According to certain embodiments, configuring module 1310 may perform certain of the configuring functions of the apparatus 1300. For example, configuring module 1310 may c configures the wireless device to determine a priority of the SR and PUSCH when the SR and PUSCH are not related to a LCH.

Optionally, in particular embodiments, virtual apparatus may additionally include one or more modules for performing any of the steps or providing any of the features described above with regard to FIG. 14 and/or described below with regard to the Group B and Group C Example Embodiments.

EXAMPLE EMBODIMENTS

Group A Embodiments

Example Embodiment 1. A method performed by a wireless device, the method comprising: any of the wireless device steps, features, or functions described above, either alone or in combination with other steps, features, or functions described above.

Example Embodiment 2. The method of embodiment 1, further comprising one or more additional wireless device steps, features or functions described above.

Example Embodiment 3. The method of any one of the previous embodiments, further comprising: providing user data; and forwarding the user data to a host computer via the transmission to the base station.

Group B Embodiments

Example Embodiment 4. A method performed by a base station, the method comprising: any of the base station steps, features, or functions described above, either alone or in combination with other steps, features, or functions described above.

Example Embodiment 5. The method of embodiment 4, further comprising one or more additional base station steps, features or functions described above.

Example Embodiment 6. The method of any one of the previous embodiments, further comprising: obtaining user data; and forwarding the user data to a host computer or a wireless device.

Group C Embodiments

Example Embodiment 7. A wireless device comprising: processing circuitry configured to perform any of the steps of any of the Group A embodiments; and power supply circuitry configured to supply power to the wireless device.

Example Embodiment 8. A base station comprising: processing circuitry configured to perform any of the steps of any of the Group B embodiments; power supply circuitry configured to supply power to the wireless device.

Example Embodiment 9. A user equipment (UE) comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment 10. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

Example Embodiment 11. The communication system of the pervious embodiment further including the base station.

Example Embodiment 12. The communication system of the previous 2 embodiments, further including the UE, wherein the UE is configured to communicate with the base station.

Example Embodiment 13. The communication system of the previous 3 embodiments, wherein: the processing circuitry of the host computer is configured to execute a host application, thereby providing the user data; and the UE comprises processing circuitry configured to execute a client application associated with the host application.

Example Embodiment 14. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B embodiments.

Example Embodiment 15. The method of the previous embodiment, further comprising, at the base station, transmitting the user data.

Example Embodiment 16. The method of the previous 2 embodiments, wherein the user data is provided at the host computer by executing a host application, the method further comprising, at the UE, executing a client application associated with the host application.

Example Embodiment 17. A user equipment (UE) configured to communicate with a base station, the UE comprising a radio interface and processing circuitry configured to performs any of the previous 3 embodiments.

Example Embodiment 18. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

Example Embodiment 19. The communication system of the previous embodiment, wherein the cellular network further includes a base station configured to communicate with the UE.

Example Embodiment 20. The communication system of the previous 2 embodiments, wherein: the processing circuitry of the host computer is configured to execute a host application, thereby providing the user data; and the UE's processing circuitry is configured to execute a client application associated with the host application.

Example Embodiment 21. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A embodiments.

Example Embodiment 22. The method of the previous embodiment, further comprising at the UE, receiving the user data from the base station.

Example Embodiment 23. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A embodiments.

Example Embodiment 24. The communication system of the previous embodiment, further including the UE.

Example Embodiment 25. The communication system of the previous 2 embodiments, further including the base station, wherein the base station comprises a radio interface configured to communicate with the UE and a communication interface configured to forward to the host computer the user data carried by a transmission from the UE to the base station.

Example Embodiment 26. The communication system of the previous 3 embodiments, wherein: the processing circuitry of the host computer is configured to execute a host application; and the UE's processing circuitry is configured to execute a client application associated with the host application, thereby providing the user data.

Example Embodiment 27. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Example Embodiment 28. A method implemented in a communication system including a host computer, a base station and a user equipment (UE), the method comprising: at the host computer, receiving user data transmitted to the base station from the UE, wherein the UE performs any of the steps of any of the Group A embodiments.

Example Embodiment 29. The method of the previous embodiment, further comprising, at the UE, providing the user data to the base station.

Example Embodiment 30. The method of the previous 2 embodiments, further comprising: at the UE, executing a client application, thereby providing the user data to be transmitted; and at the host computer, executing a host application associated with the client application.

Example Embodiment 31. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Example Embodiment 32. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

Example Embodiment 33. The communication system of the previous embodiment further including the base station.

Example Embodiment 34. The communication system of the previous 2 embodiments, further including the UE, wherein the UE is configured to communicate with the base station.

Example Embodiment 35. The communication system of the previous 3 embodiments, wherein: the processing circuitry of the host computer is configured to execute a host application; the UE is configured to execute a client application, thereby providing the user data to be received by the host computer.

cation associated with the host application, thereby providing the user data to be received by the host computer.

Example Embodiment 36. A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A embodiments.

Example Embodiment 37. The method of the previous embodiment, further comprising at the base station, receiving the user data from the UE.

Example Embodiment 38. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1RTT CDMA2000 1× Radio Transmission Technology
3GPP 3rd Generation Partnership Project
5G 5th Generation
5GS 5G System
ABS Almost Blank Subframe
ARQ Automatic Repeat Request
AWGN Additive White Gaussian Noise
BCCH Broadcast Control Channel
BCH Broadcast Channel
BW Bandwidth
CA Carrier Aggregation
CC Carrier Component
CCCH SDU Common Control Channel SDU
CDMA Code Division Multiplexing Access
CE Control Element
CGI Cell Global Identifier
CIR Channel Impulse Response
CNC Central Network Controller (for TSN)
CP Cyclic Prefix
CPICH Common Pilot Channel
CPICH Ec/No CPICH Received energy per chip divided
    by the power density in the band
CQI Channel Quality information
C-RNTI Cell RNTI
CSI Channel State Information
D2D Device-To-Device
DCCH Dedicated Control Channel
DL Downlink
DM Demodulation
DMRS Demodulation Reference Signal
DRX Discontinuous Reception
DS-TT Device Side TSN Translator
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-U IRAN NodeB
ePDCCH enhanced Physical Downlink Control Channel
E-SMLC evolved Serving Mobile Location Center
E-UTRA Evolved UTRA
E-UTRAN Evolved UTRAN FDD Frequency Division Duplex
FFS For Further Study
GERAN GSM EDGE Radio Access Network
GM Grand Master
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
IIoT Industrial Internet-of-Things
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single
    Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Chan-
    nel
NR New Radio
NW-TT Network-side TSN Translator
OCNG OFDMA Channel Noise Generator
OFDM Orthogonal Frequency Division Multiplexing
OFDMA Orthogonal Frequency Division Multiple Access
OSS Operations Support System
OTA Over the Air
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PD Propagation Delay
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
ppb parts per billion
PRACH Physical Random Access Channel
PRS Positioning Reference Signal
PSS Primary Synchronization Signal
PTP Precision Time Protocol
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RAR Random Access Response
RLM Radio Link Management
RNC Radio Network Controller
RNTI Radio Network Temporary Identifier
RRC Radio Resource Control
RRM Radio Resource Management
RS Reference Signal
RSCP Received Signal Code Power RSRP Reference Symbol Received Power OR Reference
    Signal Received Power
RSRQ Reference Signal Received Quality OR Reference
    Symbol Received Quality
RSSI Received Signal Strength Indicator
RSTD Reference Signal Time Difference
RTT Round Trip Time
SCH Synchronization Channel
SCell Secondary Cell
SCS Subcarrier Spacing
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TA Timing Advance
TDD Time Division Duplex
TDOA Time Difference of Arrival
TOA Time of Arrival
TS Time Synchronization
TSN Time Sensitive Networking
TSS Tertiary Synchronization Signal
TTI Transmission Time Interval
UE User Equipment
UL Uplink
UMTS Universal Mobile Telecommunication System
UPF User Plane Function
URLLC Ultra-Reliable Low-Latency Communications
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
The invention claimed is:

1. A method performed by a wireless device for priority handling of scheduling request, SR, and physical uplink shared channel, PUSCH, without Logical Channel, LCH, association, the method comprising:
    determining that the SR and PUSCH are not related to a
        LCH;
    determining a priority of the SR and PUSCH; and
    receiving the priority of the PUSCH associated with an
        aperiodic Channel State Information, CSI, report in a
        Radio Resource Control Information Element, RRC IE;
    wherein, in response to determining that the SR and
        PUSCH are not related to a LCH, the priority of the SR
        and PUSCH is determined based on a priority of at least
        one Medium Access Control-Control Element, MAC
        CE, or based on a physical-index-based priority of the
        SR and PUSCH.

2. The method of claim 1, wherein the MAC CE comprises at least one of a Beam Failure Recovery, BFR, MAC CE or a Listen Before Talk, LBT, failure MAC CE.

3. The method of claim 1, wherein the priority of the SR and PUSCH is determined to be a high priority, and the method further comprises prioritizing the SR and PUSCH over an overlapping resource that has a lower priority than the high priority of the SR and PUSCH.

4. The method of claim 1, further comprising prioritizing the SR and PUSCH over a grant associated with a Medium Access Control Packet Data Unit, MAC PDU, that includes only padding.

5. A wireless device for priority handling of scheduling request, SR, and physical uplink shared channel, PUSCH, without Logical Channel, LCH, association, the wireless device comprising:

processing circuitry configured to:

determine that the SR and PUSCH are not related to a LCH;

determine a priority of the SR and PUSCH; and receive the priority of the PUSCH associated with an aperiodic Channel State Information, CSI, report in a Radio Resource Control Information Element, RRC IE;

wherein, in response to determining that the SR and PUSCH are not related to a LCH, the priority of the SR and PUSCH is determined based on a priority of at least one Medium Access Control-Control Element, MAC CE, or based on a physical-index-based priority of the SR and PUSCH.

6. The wireless device of claim 5, wherein the MAC CE comprises at least one of a Beam Failure Recovery, BFR, MAC CE or a Listen Before Talk, LBT, failure MAC CE.

7. The wireless device of claim 5, wherein the priority of the SR and PUSCH is determined to be a high priority, and the processing circuitry is configured to prioritize the SR and PUSCH over an overlapping resource that has a lower priority than the high priority of the SR and PUSCH.

8. The wireless device of claim 5, wherein the processing circuitry is configured to prioritize the SR and PUSCH over a grant associated with a Medium Access Control Packet Data Unit, MAC PDU, that includes only padding.

9. A method performed by a network node for configuring a wireless device for priority handling of scheduling request, SR, and physical uplink shared channel, PUSCH, without Logical Channel, LCH, association, the method comprising:

configuring the wireless device to determine a priority of the SR and PUSCH when the SR and PUSCH are not related to a LCH;

transmitting the priority of the PUSCH associated with an aperiodic Channel State Information, CSI, report in a Radio Resource Control Information Element, RRC IE;

wherein, when the SR and PUSCH are not related to a LCH, the priority of the SR and PUSCH is determined based on a priority of at least one Medium Access Control-Control Element, MAC CE, or based on a physical-index-based priority of the SR and PUSCH.

10. The method of claim 9, wherein the priority of the SR and PUSCH is determined based on a priority of at least one Medium Access Control-Control Element, MAC CE.

11. The method of claim 10, wherein the MAC CE comprises at least one of a Beam Failure Recovery, BFR, MAC CE or a Listen Before Talk, LBT, failure MAC CE.

12. The method of claim 9, further comprising configuring the wireless device to prioritize the SR and PUSCH over an overlapping resource when the priority of the SR and PUSCH is determined to be of a higher priority than a priority of the overlapping resource.

13. The method of claim 9, further comprising configuring the wireless device to prioritize the SR and PUSCH over a grant associated with a Medium Access Control Packet Data Unit, MAC PDU, that includes only padding.

14. A network node for configuring a wireless device for priority handling of scheduling request, SR, and physical uplink shared channel, PUSCH, without Logical Channel, LCH, association, the network node comprising:

processing circuitry configured to configure the wireless device to determine a priority of the SR and PUSCH when the SR and PUSCH are not related to a LCH, the processing circuitry further configured to perform the steps of;

transmitting the priority of the PUSCH associated with an aperiodic Channel State Information, CSI, report in a Radio Resource Control Information Element, RRC IE;

wherein, when the SR and PUSCH are not related to a LCH, the priority of the SR and PUSCH is determined based on a priority of at least one Medium Access Control-Control Element, MAC CE, or based on a physical-index-based priority of the SR and PUSCH.

15. The network node of claim 14, wherein the priority of the SR and PUSCH is determined based on a priority of at least one Medium Access Control-Control Element, MAC CE.

16. The network node of claim 15, wherein the MAC CE comprises at least one of a Beam Failure Recovery, BFR, MAC CE or a Listen Before Talk, LBT, failure MAC CE.

17. The network node of claim 14, wherein the processing circuitry is configured to configure the wireless device to prioritize the SR and PUSCH over an overlapping resource when the priority of the SR and PUSCH is determined to be of a higher priority than a priority of the overlapping resource.

* * * * *